United States Patent [19]
Allread

[11] Patent Number: 5,288,110
[45] Date of Patent: Feb. 22, 1994

[54] FLEXIBLE CONNECTOR ASSEMBLY
[75] Inventor: Alan R. Allread, Jackson, Mich.
[73] Assignee: Aeroquip Corporation, Maumee, Ohio
[21] Appl. No.: 886,624
[22] Filed: May 21, 1992
[51] Int. Cl.[5] .............................................. F16L 27/04
[52] U.S. Cl. .................................. 285/166; 285/263; 285/351
[58] Field of Search ............... 285/166, 167, 263, 261, 285/51, 351, 271

[56] References Cited
U.S. PATENT DOCUMENTS

| | | |
|---|---|---|
| 746,360 | 12/1903 | McAdams ........................... 285/166 |
| 900,533 | 10/1908 | Hawley . |
| 1,500,921 | 7/1924 | Bramson et al. ..................... 285/166 |
| 1,543,348 | 6/1925 | Venton . |
| 1,604,868 | 10/1926 | Woodruff . |
| 1,925,335 | 9/1933 | Murphy ........................... 285/166 X |
| 2,010,546 | 8/1935 | Kenney . |
| 2,273,395 | 2/1942 | Couty . |
| 2,550,536 | 4/1951 | Delano, Jr. et al. . |
| 2,657,076 | 10/1953 | Hubbell . |
| 2,836,436 | 5/1958 | Bianchi . |
| 3,479,061 | 11/1969 | Smookler et al. ............... 285/263 X |
| 3,528,260 | 9/1970 | Binder . |
| 3,712,645 | 1/1973 | Herter ........................... 285/166 X |
| 3,788,394 | 1/1974 | Derragon, Jr. . |
| 4,408,467 | 10/1983 | Murnane et al. . |
| 4,427,220 | 1/1984 | Decker ........................... 285/351 X |
| 4,480,857 | 11/1984 | Graves . |
| 4,793,150 | 12/1988 | Wattley et al. . |
| 4,906,027 | 3/1990 | De Gruijter . |
| 5,048,309 | 9/1991 | Carlisle, Jr. . |
| 5,048,873 | 9/1991 | Allread et al. . |
| 5,127,681 | 7/1992 | Thelen et al. ........................ 285/167 |

FOREIGN PATENT DOCUMENTS

| | | | |
|---|---|---|---|
| 1233069 | 10/1960 | France .............................. 285/166 |
| 626968 | 7/1949 | United Kingdom ................ 285/351 |
| 2238838 | 6/1991 | United Kingdom ................ 285/166 |

Primary Examiner—Dave W. Arola
Attorney, Agent, or Firm—Emch, Schaffer, Schaub & Porcello Co.

[57] ABSTRACT

A flexible connector to be used individually or in an assembly of connectors. The connector includes a collar comprised of a wall having a cylindrical inner surface. The collar wall defines two opposed openings. Two flanges extend radially inwardly covering a portion of each opposed opening. The connector further includes a link comprised of a link wall having at least one spherically-shaped outer surface. The link wall defines at least one open end to allow for the passage of a fluid. The link wall is positioned within one of the opposed openings in spaced relationship to the cylindrical inner surface of the collar wall. Bearing means and gasket means are positioned in the space defined by the spaced relationship to allow the link to articulate with respect to the collar and also to seal the space between the outer surface of the link and the inner wall of the collar.

15 Claims, 4 Drawing Sheets

FLEXIBLE CONNECTOR ASSEMBLY

TECHNICAL FIELD

The present invention relates to a flexible connector assembly fastened to rigid lengths of tubing for use in an automotive air conditioning system. The connector can withstand vibration and movement with minimal effusion or leakage of fluid from or ingression of moisture into the system and without creating excessive levels of fluid dynamic noise.

BACKGROUND OF THE INVENTION

Flexible connectors are known in the art. Examples of various connectors can be found in U.S. Pat. Nos. 2,010,546; 2,273,395; 2,657,076; 2,836,436; 3,528,260; 3,788,394; 4,408,467; 4,480,857; 4,793,150 and 5,048,873.

In a typical automobile air conditioning system presently in use, refrigerant is conveyed by flexible hoses and rigid tubing to the compressor, the condenser and the evaporator. The flexible hoses and rigid tubing accommodate the vibration and movement existing between the vehicle frame, upon which the condenser and evaporator are rigidly affixed, and the vehicle engine upon which the compressor is rigidly affixed.

Refrigerant utilized in automobile air conditioning systems has historically been a chloroflourocarbon (CFC). More recently, hydroflourocarbon (HFC) refrigerant has been adopted and is expected to replace CFC refrigerant as the dominant refrigerant used in such systems. HFC refrigerant is extremely expensive, much more expensive than CFC refrigerant. However, with progressive taxation recently placed on CFC refrigerant, its cost will similarly rise. Further, CFC refrigerants have been found to be detrimental to the environment if released into the atmosphere. Accordingly, it is important that air conditioning systems used in vehicles be designed to prevent, to the greatest degree possible, any escape of CFC and HFC refrigerants into the atmosphere. The challenge to develop such a system has intensified because flexible hose assemblies presently used to convey refrigerant through the system often permit refrigerant loss by effusion through the hose wall and end fitting connection sites.

Flexible hoses presently used in air conditioning systems permit variable levels of moisture ingression which over time greatly reduces the efficiency of the system. Flexible hoses are also subject to twisting during installation, which not only causes premature wear, but also places undesirable stresses and potential failure and leakage at the fittings fastening such hoses to system elements. In contrast, rigid lengths of tubing formed of any one of a wide variety of materials are capable of transporting refrigerant throughout the air conditioning system without effusion of refrigerant or infusion of undesirable moisture through the conduit walls. For example, the tubing may be formed of metal such as aluminum, steel or a variety of other metals. However, aluminum is preferred from the standpoint of minimizing weight. Additionally, the tubing may be formed of a wide variety of plastics. In order to utilize rigid lengths of tubing for conveying the refrigerant in an air conditioning system of a vehicle, while providing a system with adequate flexibility, it is necessary that the rigid lengths of tubing include flexible connectors that permit pivotal, articulating, and/or rotational movement of one tube section length relative to another.

As is well known in the art, refrigerant in the air conditioning system of a vehicle is transported under varying pressures including pressures potentially as high as 500 pounds per square inch (psi). Accordingly, it is necessary that any connectors for connecting lengths of tubing have adequate means, for sealing therebetween, to prevent or at least minimize the leakage of refrigerant. As may be appreciated, the challenge is to provide a flexible connector assembly for fastening together the rigid tubing lengths so that there is no appreciable loss of refrigerant from or infusion of moisture into an air conditioning system.

SUMMARY OF THE INVENTION

The present invention is directed to a flexible connector which can be used individually or in an assembly of connectors. The connector includes a collar comprised of a wall having a cylindrical inner surface. The collar wall defines two opposed openings. Two flanges extend radially inwardly covering a portion of each opposed opening.

The connector further includes a link comprised of a link wall having at least one spherically-shaped outer surface. The link wall defines at least two open ends to allow for the passage of a fluid. The link wall is positioned within one of the opposed openings in spaced relationship to the cylindrical inner surface of the collar wall. Bearing means and gasket means are positioned in the space defined by the spaced relationship to allow the link to articulate with respect to the collar and also to seal the space between the outer surface of the link and the inner wall of the collar.

It is a primary object of the present invention to provide a flexible connector that is capable of fastening together rigid tubing without significant loss of fluid or ingression of moisture.

It is an important object of the present invention to provide a flexible connector that is capable of accommodating the vibrations and movements of the rigid tubing to which the connector is attached.

Other objects and advantages of the present invention will become apparent as the invention is described in detail with reference being made to the accompanying drawings.

DESCRIPTION OF THE PREFERRED EMBODIMENTS

Figure 1:
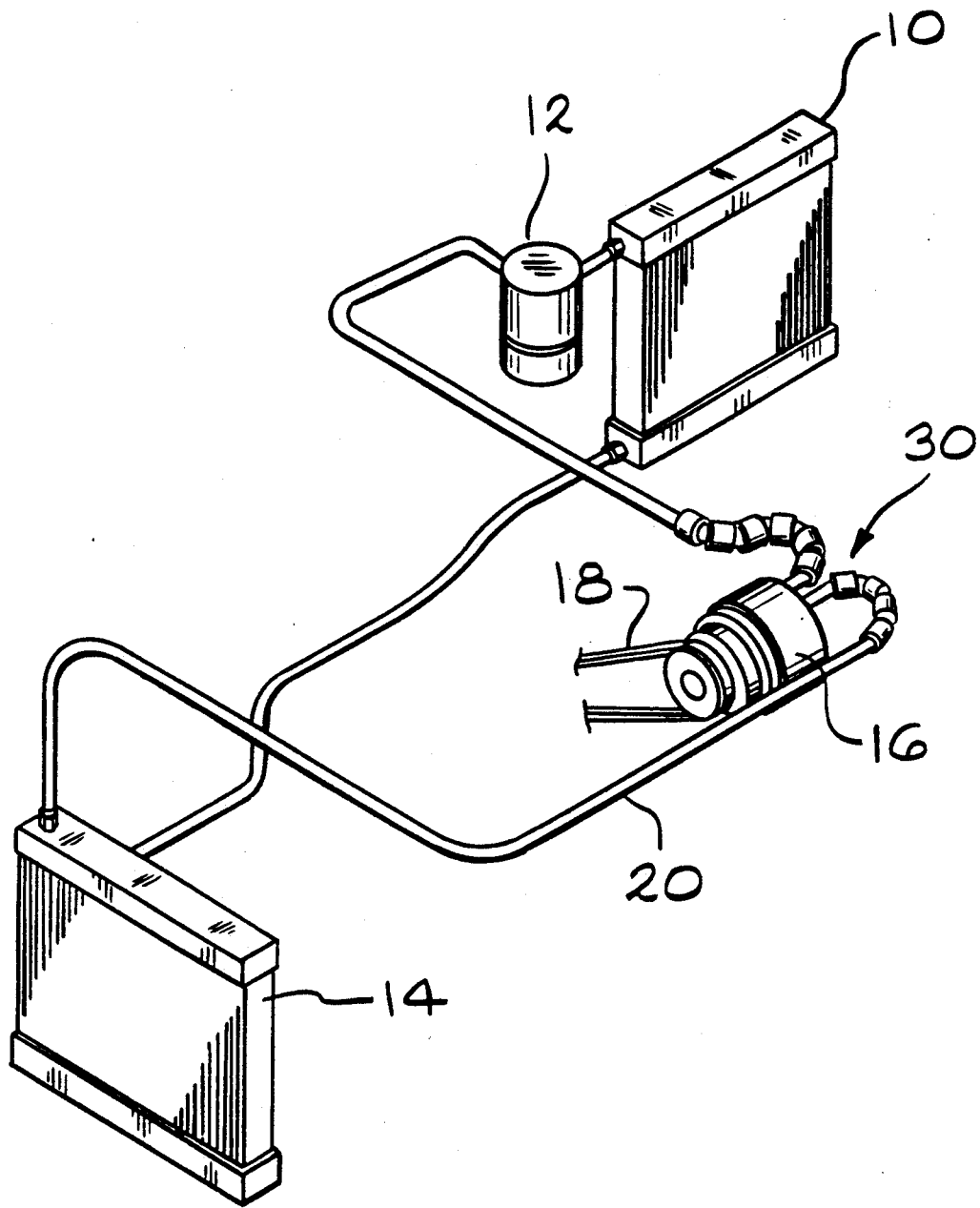
FIG. 1 is a schematic view of an automotive air conditioning system with the present invention included therein.

Referring now to the drawings, the preferred embodiments of the present invention are shown. Referring to FIG. 1, an automotive air conditioning system is shown. The system includes an evaporator 10, a drier receiver filter 12, a condenser 14 and a compressor 16 connected to a drive belt 18. The system further includes a number of rigid tubes, for example tube 20, to allow liquid refrigerant to flow through the system. The tubes move in response to certain forces placed on them such as movement of the automobile, expansion and contraction and activation of, for example, the compressor 16. The flexible connector 30 of the present invention is placed within the system to allow the rigid tubes to move in response to such forces. It has also been found that the present invention allows the compressor 16 to be moved in order to adjust or change the drive belt 18.

If the torsional forces and bending moments, as described above, are not accommodated, undue stress and strain will be placed upon the rigid lengths of tubing and the connectors at the evaporator, condenser and compressor. This results in stress cracking and refrigerant loss.

The exact location and number of flexible connectors required in the system must be empirically determined and will depend upon the configuration of the fluid transport system. However, it can reasonably be assumed that at least one flexible connector will be required in each compressor refrigerant tubing line to accommodate torsional forces and bending moments that will otherwise be imposed upon each respective tubing line.

Figure 2:
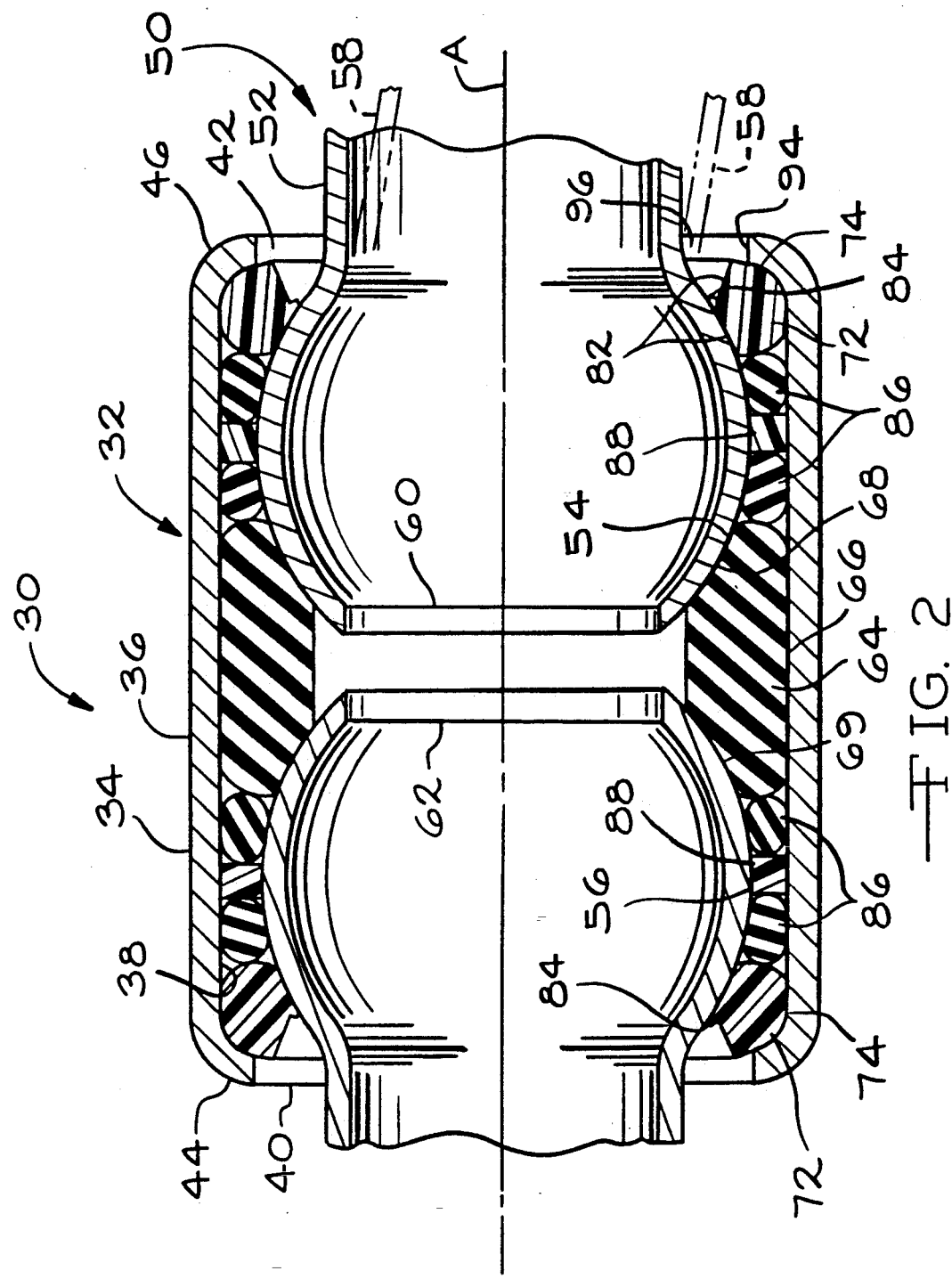
FIG. 2 is an enlarged cross-sectional view showing the preferred embodiment of a flexible connector according to the present invention.

Referring to FIG. 2, a first embodiment of the present invention is shown. The flexible connector 30 includes a collar 32. The collar 32 is comprised of a collar wall 34 having a cylindrical exterior surface 36 and a cylindrical inner surface 38. The collar wall 34 defines two opposed openings 40 and 42. The collar wall 34 includes two flanges 44 and 46 extending radially inwardly from the wall. The flanges 44 and 46 each cover a portion of the two opposed openings 40 and 42, respectively.

The collar 32 can be made of a variety of materials depending on the application. It has been found that metal and plastic are suitable materials, with metal being preferred.

Figure 3:
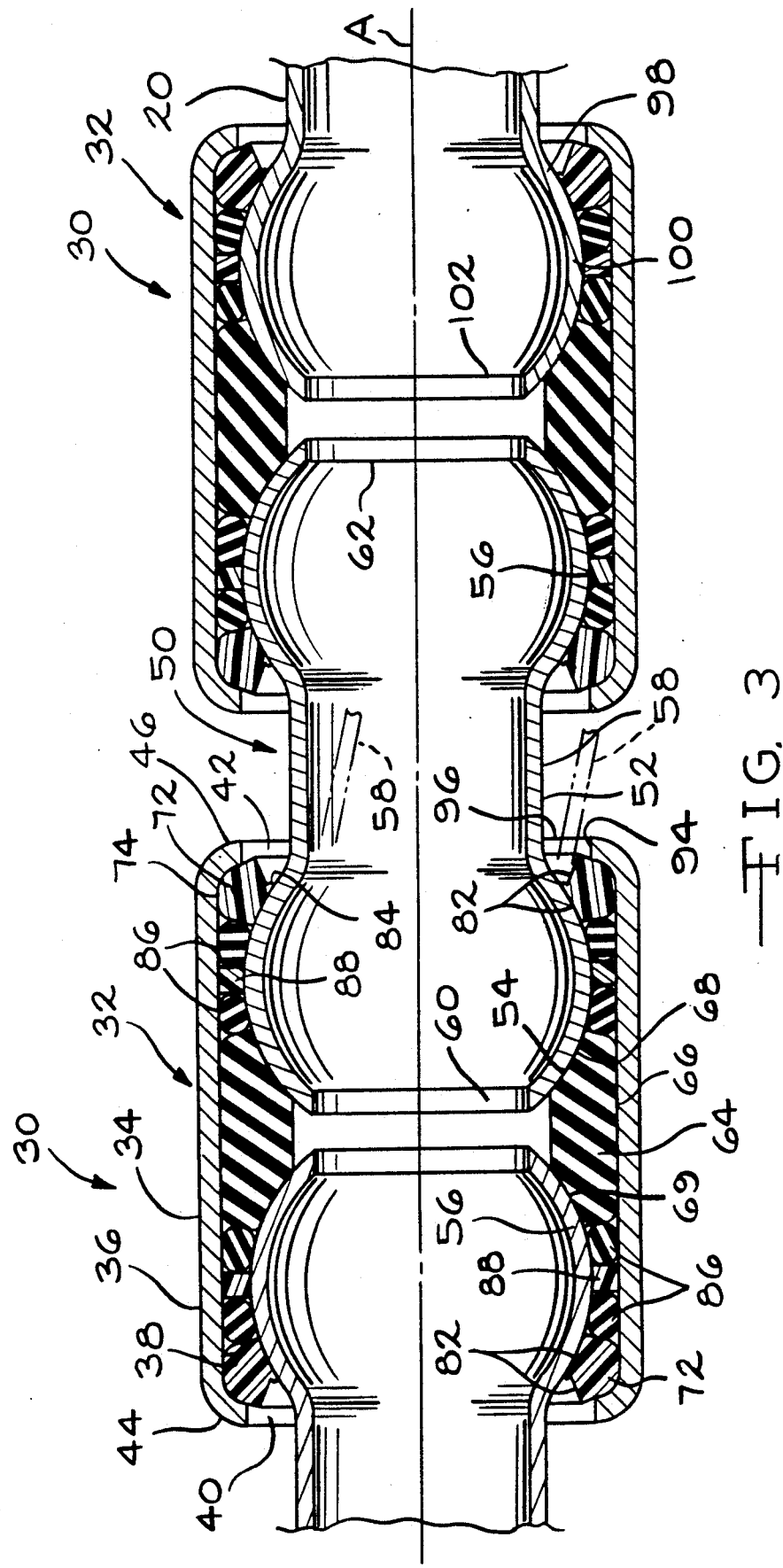
FIG. 3 is an enlarged cross-sectional view showing the preferred embodiment of a plurality of flexible connectors according to the present invention.

Referring to FIGS. 2 and 3, the flexible connector 30 includes a link 50. The link 50 is comprised of a link wall 52. The link wall 52 includes at least one spherically-shaped outer surface. In the present embodiment, the link 50 includes two spherically-shaped outer surfaces 54 and 56 positioned on opposed ends of a tube member 58. The link wall 52 defines open ends 60 and 62 in the spherically-shaped outer surfaces 54 and 56, respectively. The open ends provide passageways for the conveyance of fluid through the link. In the case of an automotive air conditioning system, the fluid to be conveyed is a refrigerant. However, many types of fluids, gaseous or liquid, may flow through the flexible connector 30 of the present invention, when used in other applications.

As can be seen in FIG. 2, the outer surface 54 of the link wall 52 is received within the collar 32 through opening 42. The outer diameter of the outer surface 54 taken through a plane perpendicular to axis A is smaller than the inner diameter of the collar 32 with the result that the outer surface 54 is in spaced relationship with the inner surface 38 of the collar 32.

As shown in FIG. 2, there are positioned within the space between the outer surface 54 of the link 50 and the inner surface 38 of the collar 32 a primary circumferential bearing 64 and a universal circumferential bearing 72. The bearings function to support the link 50 in the collar 32. The primary bearing 64 includes an exterior surface 66 following a generally oval-shaped configuration having a portion that engages the inner surface 38 of the collar 32. The primary bearing 64 also has at least one interior surface that follows a spherical configuration similar to that of the outer surface 54 of the link 50. In the present embodiment, there are two interior surfaces 68 and 69 that engage surfaces 54 and 56, respectively.

The universal circumferential bearing 72 includes an exterior surface 74 following a generally U-shaped configuration with the legs of the U tapering outwardly and with an area near the top of the U intended to engage the inner surface 38 of the collar 32. A portion of the exterior surface 74 of the bearing 72 engages the flange 46 of the collar 32. The bearing 72 has interior surfaces 82 that follow a spherical configuration similar to that of the outer surface 54 of the link 50. As an optional feature, there may be provided a radially inwardly extending lip 84 extending from the interior surfaces and lying on a plane extending generally through the bearing 72. As shown in FIG. 2, when the flexible connector is assembled, the lip 84 of the bearing will, under pressure, be bent or folded over and act as a dust wiper as it moves against the outer surface 54 upon movement of the link 50 relative to the collar 32.

Positioned between the bearings 64 and 72 are a pair of annular gaskets, such as O-ring seals 86, that are spaced apart with a circumferential spacer 88 positioned therebetween. The O-ring seals 86 are compressed between and form a liquid and vapor seal between the outer surface 54 of the link 50 and the inner surface 38 of the collar 32. The O-ring seals 86 may also contact the adjacent bearings 64 or 72 and the spacer 88. However, such contact is not required for a liquid and vapor tight seal. Other gaskets having different configurations may be used in place of the O-ring seals.

As shown in FIG. 2, when two links are positioned within a collar 32, there is one primary bearing 64 positioned adjacent the open ends 60 and 62 of the links. There are also two universal bearings 72 adjacent the flanges 44 and 46 of the collar 32. The primary bearing 64 and the universal bearings 72 are separated by two pairs of O-ring seals 86 positioned on both sides of the primary bearing 64. The pair of O-ring seals 86 are separated by spacers 88.

The bearings 64 and 72 are preferably formed of nylon but may be formed of other materials possessing chemical resistance to the fluid being conveyed and sufficient strength to support the members in sealed position while permitting rotational and pivotal movement between the link 50 and the collar 32. Other suitable materials for the bearings include various metals, ceramics and other thermoplastics. The O-ring seals 86 are preferably formed of resilient, chemically stable polymeric materials, such as nitrite, chlorobutyl, hydrogenated nitrile or neoprene. The spacers may be formed of the same materials as the bearings.

Referring to FIGS. 2 and 3, the flange 46 of the collar 32 terminates at an end 94 that is radially spaced from the tube member 58 of the link 50. The flanges 44 and 46 are formed by a typical metal forming process, such as rolling or crimping. This leaves a gap 96 between the end 94 and the tube member 58. The presence of the gap 96, in conjunction with the spherical configuration of the outer surface 54 of the link 50 slidably engaged to the interior surfaces 68 and 82 of the bearings 64 and 72, respectively, permits the tube member 58 of link 50 to move pivotally to the position, for example, as shown in phantom lines in FIG. 2. This construction also permits the link 50 to be moved rotationally relative to the collar 32.

The outer surface 54 of the link 50 may be coated with synthetic resin polymers and products, including polytetrafluoroethylene polymers, such as TEFLON ® material, that will serve to reduce the frictional wear on the bearings 70 and 72 and seals 86. This acts to increase their useful life.

As shown in FIGS. 1 and 3, there can be a plurality of links and collars joined together to form a flexible chain. The number of links and collars to be joined together will vary depending on the application.

As shown in FIG. 3, an assembly of links and collars may be joined to rigid lengths of tubing. This junction can be achieved by enlarging the end 98 of the tube 20, through processes well-known in the art, to form a spherical enlargement 100 similar to the outer surface 54 of a link 50. The tube terminates in an open end 102. The spherical enlargement 100 is positioned within a collar 32 in the same way a link is positioned within a collar. When the tube end 98 is positioned within the collar 32, the open end 102 of the tube 20 is in communication with the open end 62 of the link 50 thereby allowing fluid to pass through the system.

Figure 4:
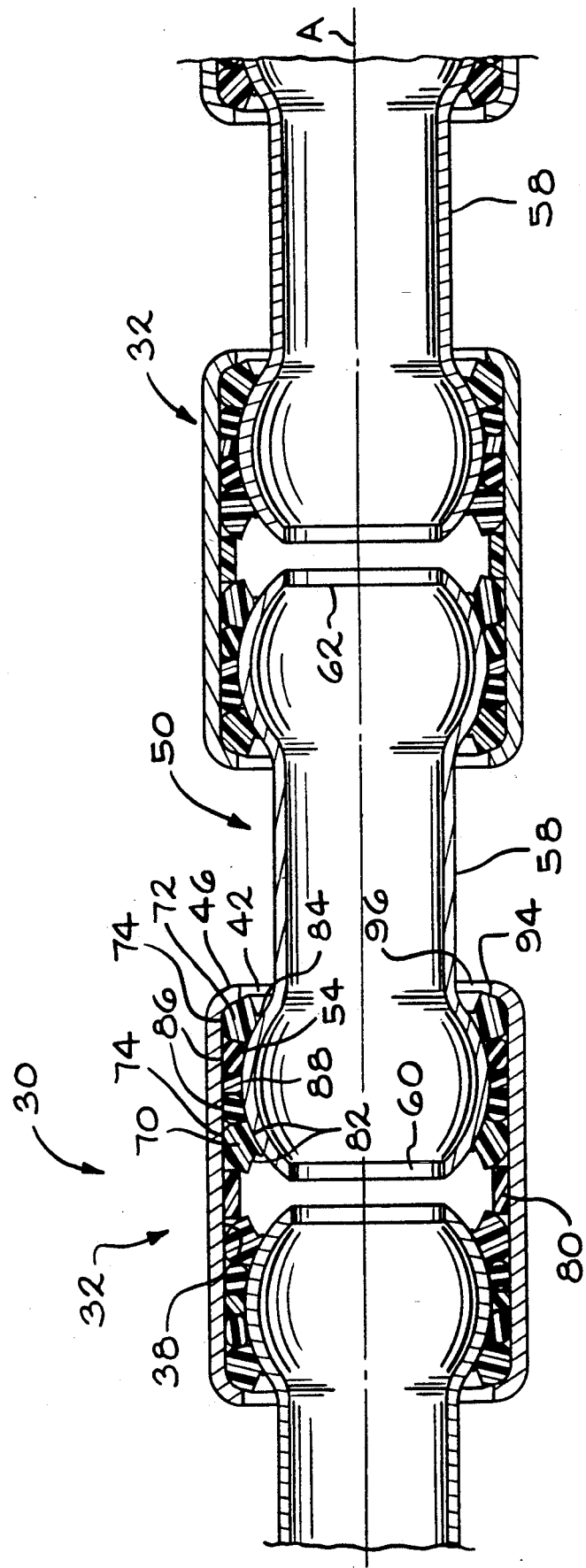
FIG. 4 is an enlarged cross-sectional view similar to FIG. 3 showing a second embodiment of a flexible connector according to the present invention.

Referring now to FIG. 4, a second embodiment of the present invention is shown. In this embodiment, the tube member 58 of the link 50 is elongated. This elongation allows the link 50 to have a greater offset.

Positioned within the space between the outer surface 54 of the link 50 and the inner surface 38 of the collar 32 are a pair of universal circumferential bearings 70 and 72. The bearings function to support the link 50 in the collar 32. The first bearing 70 and second bearing 72 include an exterior surface 74 following a generally U-shaped configuration with the legs of the U tapering outwardly and with an area near the top of the U intended to engage the inner surface 38 of the collar 32.

A portion of the exterior surface 74 of the first bearing 70 engages a circumferential spacer 80. Similarly, a portion of the exterior surface 74 of the second bearing 72 engages the flange 46 of the collar 32.

The bearings 70 and 72 also have a pair of identical interior surfaces 82 that follow a spherical configuration similar to that of the outer surface 54 of the link 50. As described above, there may be provided a radially inwardly extending lip 84 extending from the respective interior surfaces 82 and lying on a plane extending centrally through the bearings 70 and 72. When the flexible connector 30 is assembled, the lip 84 of the bearings will, under pressure, be bent or folded over and act as a dust wiper as it moves against the outer surface 54 upon movement of the link 50 relative to the collar 32.

As shown in FIG. 4, positioned between the bearings 70 and 72 are a pair of O-ring seals 86 that are spaced apart with a circumferential spacer 88 positioned therebetween. The O-ring seals 86 are compressed between and form a liquid and vapor tight seal between the outer surface 54 of the link 50 and the inner surface 38 of the collar 32. The O-ring seals 86 may also contact the adjacent bearings 70 or 72 and the spacer 88. However, such contact is not required for a liquid and vapor tight seal.

Still referring to FIG. 4, when two spheres are positioned within a collar, there are two sets of first and second bearings for each respective outer surfaces 54 and 56. Each of the sets of bearings is separated by a pair of O-ring seals 86 positioned between the first bearings 70 and the second bearing 72. The O-ring seals 86 are separated by a spacer 88. The second bearings 72 of each set of bearings is separated by the spacer 80. The bearings, O-ring seals and spacers of this embodiment may be made of the same materials as described above.

It should be understood that the embodiment of the present invention shown in FIG. 4 may be assembled with the same bearings and gaskets as described in the preferred embodiment. Further, the preferred embodiment may include a link 50 having an elongated tube member 58 as shown in FIG. 4.

Many changes can be made to the present invention disclosed in the drawings and still fall within the scope of the following claims.

I claim:

1. A flexible connector comprising:
   a collar, said collar comprising a collar wall having a cylindrical inner surface, said collar wall defining two opposed openings, said collar wall having two flanges extending radially inwardly covering a portion of each opposed opening;
   a link, said link comprised of a link wall having at least one spherically-shaped outer surface, said link wall defining an open end, said link wall positioned within one of said opposed openings in spaced relationship to said cylindrical inner surface of said collar wall; and
   bearing means and gasket means positioned in the space defined by said spaced relationship, said bearing means including at least one first bearing encircling and slideably engaged to said outer surface and in contact with said cylindrical inner surface adjacent one of said open ends defined by said link wall and at least one second bearing encircling and slideably engaged to said outer surface in contact with said cylindrical inner surface adjacent said opening defined by said collar walls; said gasket means including at least one annular gasket sealingly engaged to said cylindrical inner surface and said spherically-shaped outer surface and positioned between said first and second bearings.

2. The flexible connector of claim 1, wherein said link includes a tube member.

3. The flexible connector of claim 2, wherein said link is comprised of two spherically-shaped outer surfaces positioned on opposed ends of said tube member.

4. The flexible connector of claim 3, wherein said link wall defines two open ends, said open ends being defined in said spherically-shaped outer surfaces.

5. The flexible connector of claim 1, wherein said bearing means and gasket means includes first and second bearings with a pair of annular gaskets positioned therebetween.

6. The flexible connector of claim 5, wherein said annular gaskets are separated by a spacer.

7. The flexible connector of claim 1, wherein said bearing and gasket means includes one first bearing positioned between two second bearings, each of said second bearings having a pair of annular gaskets positioned between said first bearing and said second bearings.

8. The flexible connector of claim 1, wherein said bearing and gasket means includes two sets of first bearings and second bearings, each of said sets having a pair of annular gaskets positioned between said first bearings and said second bearings.

9. The flexible connector of claim 1, wherein said bearing means includes a radially inwardly extending lip.

10. A flexible connector assembly comprising, in combination:

at least three collars, said collars comprised of a collar wall having a cylindrical inner surface, said collar wall defining two opposed openings, said collar wall having two flanges extending radially inwardly covering a portion of each opposed opening;

at least two links, each of said links comprised of a link wall having a first spherically-shaped outer surface and a second spherically-shaped outer surface positioned on opposed ends of a tube member, said link wall defining an open end on each outer surface, said first outer surface of each link being positioned within one of said opposed openings of a first collar, said second outer surface of each link being positioned within one of said opposed openings of said second or third collar, said first and second outer surfaces being in a spaced relationship to said cylindrical inner surfaces of said respective collar walls; and bearing means and gasket means positioned in the space defined by said spaced relationship, said bearing means including at least one first bearing encircling and slideably engaged to said outer surface and in contact with said cylindrical inner surface adjacent one of said open ends defined by said link wall and at least one second bearing encircling and slideably engaged to said outer surface in contact with said cylindrical inner surface adjacent said opening defined by said collar wall, said gasket means including at least one annular gasket sealingly engaged to said cylindrical inner surface and said spherically-shaped outer surface and positioned between said first and second bearings.

11. The flexible connector of claim 10, wherein said bearing means and gasket means includes first and second bearings with a pair of annular gaskets positioned therebetween.

12. The flexible connector of claim 11, wherein said annular gaskets are separated by a spacer.

13. The flexible connector of claim 10, wherein said bearing and gasket means includes one first bearing positioned between two second bearings, each of said second bearings having a pair of annular gaskets positioned between said first bearing and said second bearings.

14. The flexible connector of claim 10, wherein said bearing and gasket means includes two sets of first bearings and second bearings, each of said sets having a pair of annular gaskets positioned between said first bearings and said second bearings.

15. The flexible connector of claim 10, wherein said second bearing includes a radially inwardly extending lip.

* * * * *